(12) United States Patent
Chan

(10) Patent No.: US 7,399,107 B2
(45) Date of Patent: Jul. 15, 2008

(54) LCD BACK LIGHT MODULE STRUCTURE

(75) Inventor: Tsung-Wen Chan, Taipei (TW)

(73) Assignee: Tsung-Wen Chan, Taipei (TW)

( * ) Notice: Subject to any disclaimer, the term of this patent is extended or adjusted under 35 U.S.C. 154(b) by 0 days.

(21) Appl. No.: 11/480,949

(22) Filed: Jul. 6, 2006

(65) Prior Publication Data

US 2008/0007962 A1    Jan. 10, 2008

(51) Int. Cl.
*F21V 7/04* (2006.01)
*F21V 21/00* (2006.01)

(52) U.S. Cl. ............ 362/561; 362/249; 362/613

(58) Field of Classification Search ........... 362/244, 362/249, 250, 252, 612, 613, 561
See application file for complete search history.

(56) References Cited

U.S. PATENT DOCUMENTS 4,908,743 A * 3/1990 Miller .................. 362/238
5,559,681 A * 9/1996 Duarte .................. 362/252

* cited by examiner

*Primary Examiner*—John A Ward
(74) *Attorney, Agent, or Firm*—Rosenberg, Klein & Lee

(57) ABSTRACT

Disclosed is a LCD back light module structure comprising one or more than one LED arrayed along an electric conducting stick which being equipped with conductor blades on its surface. The conductor blade is used for connecting the conducting stick to a driving circuit. A blind hole is formed on the conducting stick and the light spot of the Led die is buried in the blind hold and the electric connection is extended from the light spot to the adjacent two conductor blades. After being completed connection for each LED die, the epoxy resin is infused around the blind hole to form a transparent lens. The high crowned configuration of the lens enables the LED to uniformly emit the light therefrom therefore each LED forms a uniformly brilliant lighting surface on the LCD back light module structure.

1 Claim, 3 Drawing Sheets

LCD BACK LIGHT MODULE STRUCTURE

BACKGROUND OF THE INVENTION

1. Field of the Invention

He present invention relates to a LCD back light module structure, and more particularly, to a LCD back light module structure wherein a LED with high-crowned configuration is employed as a back light source to emit light uniformly on the LCD such that the LCD appears to be comfortably brilliant.

2. Description of the Prior Art

Generally, the white cold cathode fluorescent lamp (CCFL) is the most well-known LCD back light source. The LCD illuminated by a CCFL placed behind the LCD as a back light source. The capacity of CCFL and its driving circuit increases as the size of LCD increase. In order to strengthen the power output of the LCD back light, it is required to connect a plurality of CCFLS in series or parallel. But the things always have a limit, it is impossible to increase the output of a LCD back light source as large as possible only relying on CCFL. Moreover, the short life of CCFL affects the lifespan of the LCD. In addition to its high power consumption, the harmful ingredient of CCFL is a killer to environmental protection.

Accordingly, looking for a better LCD back light source is an urgent matter. A comparatively matured technical selection is a high intensity white LED. It has been a quite long experience using LED as a back light source for a small sized LCD screen such as in a cellular phone or on a PDA. Recently, following the improvement of the manufacturing technology, the brightness of the LED is remarkably upgraded, together with its compactness, light weight, rigidity, and long life, all these merits are summed up to cause the LED to become a first selection for the LCD back light source.

In a common practice for using the LED to form a LCD back light source, different numbers of LEDS are disposed at one or two sides of the LCD so as to display a picture on a LCD screen by the light outputted from the LEDS as long as the electric power is supplied. It should be understood that the light is not uniformly diffused from the LED, and instead, it is concentrated to intensively illuminate a limited spot leaving the comparative surrounding zones rather weakly illuminated. In order to overcome such a shortcoming, it is recommended to dispose the numbers of LEDS densely so as to connect side by side the illuminated zones of the proximate LEDS thereby attaining a uniform lighting effect. However, it is said that the optimistic gain is very little in comparison to a substantially large power consumption and material investment.

Aiming at the above depicted defects, the present invention is to propose a newly developed LCD back light module structure capable of palliating the inherent shortcomings of the conventional techniques.

SUMMARY OF THE INVENTION

It is an object of the present invention to provide a LCD back light module structure in which the LED used as the back light source is configured into a high crowned lens to ensure a uniform light output from LED to illuminate the LCD.

It is another object of the present invention to provide a LCD back light module structure in which an intensive white LED is employed as a light source to cause the LCD to display a highly qualified picture with a brilliant light, and also able to prolong the lifespan of the structure.

To achieve the aforesaid objects, the LCD back light module structure of the present invention comprises one or more than one LED arrayed along a guide stick equipped with conductor blades on the surface thereof. The conductor blade is used for connecting to a driving circuit. A blind hole is formed on the guide stick and the light spot of the LED die is affixed to the blind hole and the electric connection is made from the light spot to the two adjacent conductor blades. After the necessary electric connection for each LED die is completed, the epoxy resin is infused around the blind hole to form a transparent lens for the LED. The transparent lens has a high crowned configuration which enables the LED to uniformly output the light therefrom to illuminate the CD. Therefore each LED provides numerous uniform bright spots on the LCD surface such that the LCD appears to be comfortably brilliant.

BRIEF DESCRIPTION OF THE DRAWINGS

The above objects and other merits of the present invention will become more apparent by describing in detail the preferred embodiment of the present invention with reference to the attached drawings in which.

DETAILED DESCRIPTION OF THE PREFERRED EMBODIMENT

Figure 1:
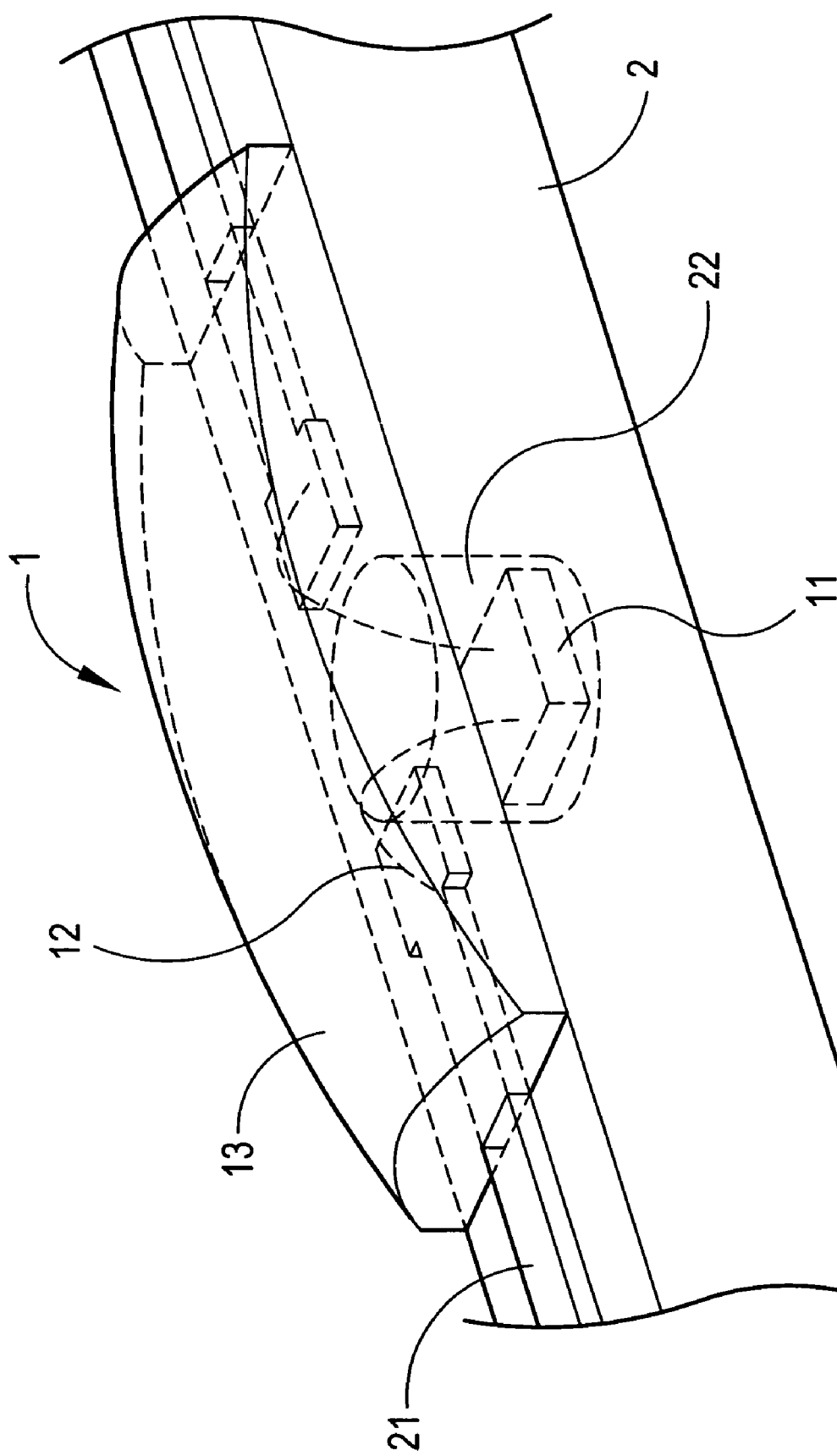
FIG. 1 is a perspective view of a single LED structure according to the present invention.
Figure 2:
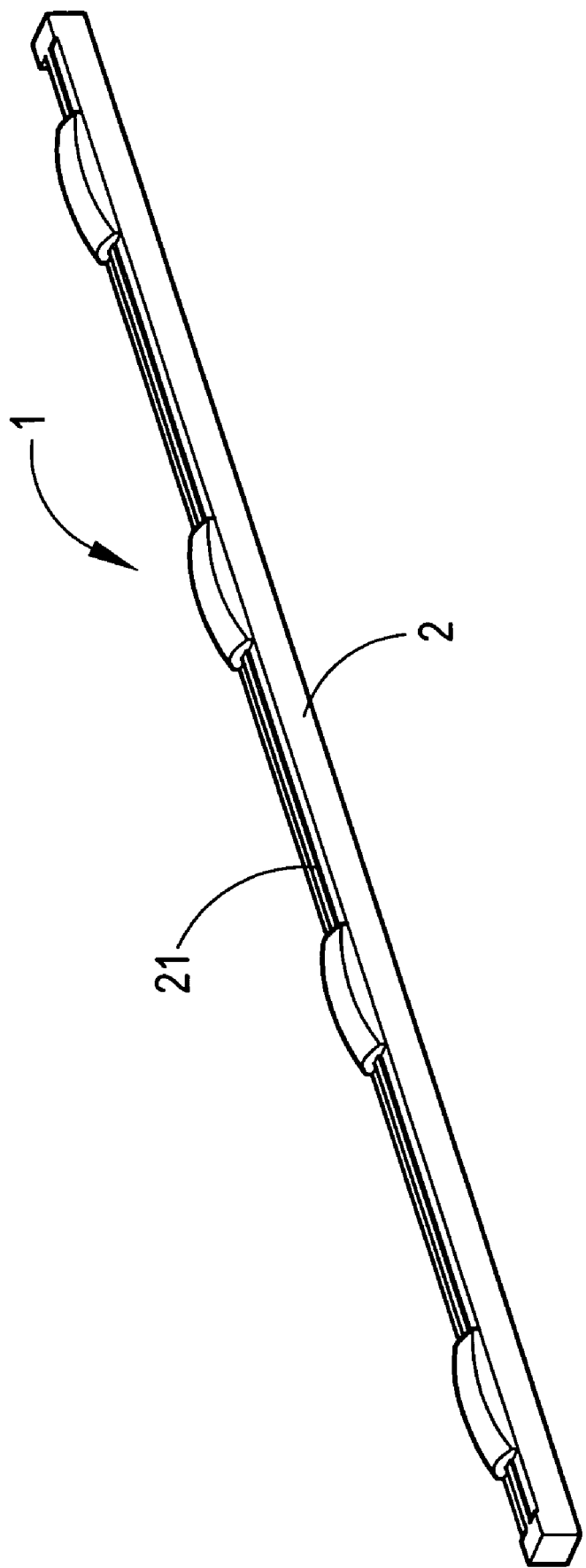
FIG. 2 is a perspective view showing the structure of the guide stick with a plurality of LED arrayed on it according to the present invention.
Figure 3:
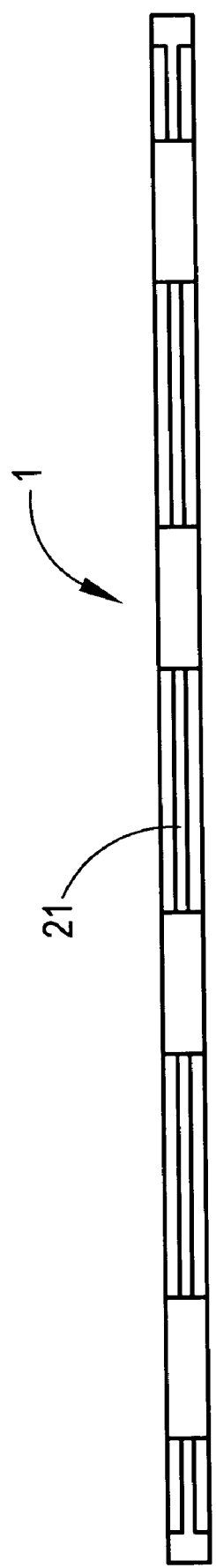
FIG. 3 and FIG. 4 are the top view and the front view of FIG. 2 respectively.
Figure 4:
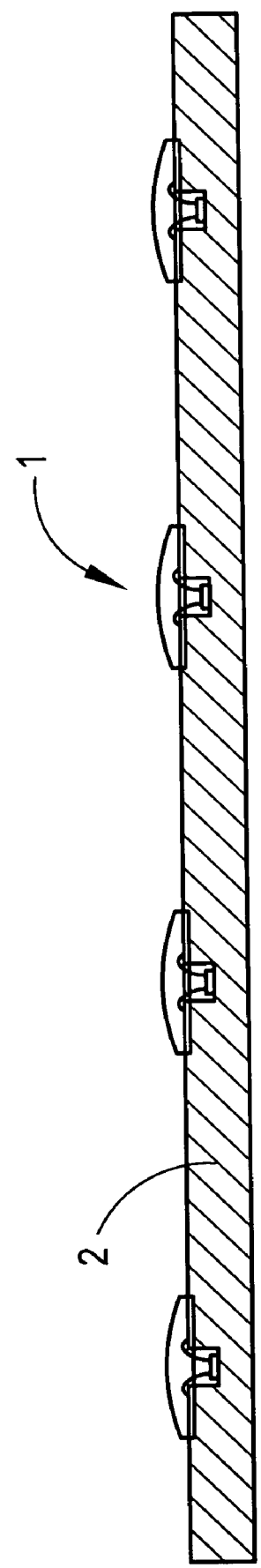

Referring to FIG. 1 through FIG. 4, the present invention comprises a guide stick 2 on which a plurality of LEDS 1 are arrayed to illuminate a LCD (not shown) with their light output, the light of different LEDS 1 can be partly over lapped to ensure a perfect distribution of light on the LCD. The guide stick 2 is equipped with a number of conductor blades 21 which being for connecting with a driving circuit (not shown) to actuate the LEDS to output light. A blind hole 22 is formed on the guide stick 2 and the light spot 11 of each LED die is affixed to its blind hole 22. The conductor wires 12 of the light spot 11 are extended to the proximate conductor blades 21 at both sides. After the necessary electric connection for each LED die is completed, the epoxy resin is infused around the blind hole 22 to form a transparent lens 13 for the LED 1. With this structure the light output from the light spot 11 is at first concentrated in the blind hole 22, and then illuminates the LCD through lens 13. The transparent lens 13 is configurated into a high crowned shape so as to enable the LED 1 to uniformly diffused the light from the lens 13, and not to concentrate to one spot thereby uniformly illuminating the LCD surface such that the LCD appears to be comfortably brilliant.

In addition, glass or other high light permeable materials is allowable to form the transparent leans 13 other than the aforesaid epoxy resin.

While the invention has been described in terms of what are presently considered to be the most practical and preferred embodiment, it is to be understood that the invention need not be limited to the disclosed embodiment. On the contrary, it is intended to cover various modifications and similar arrangement included within the spirit and scope of the appended claims which are to be accorded with the broadest interpretation so as to encompass all such modifications and similar structures.

What is claimed is:

1. An LCD back light module structure comprising:

a longitudinally extended guide stick, said guide stick having a plurality of blind holes formed in an upper surface thereof in longitudinally spaced relationship;

a plurality of conductor blades disposed on said upper surface of said guide stick, each of said plurality of conductor blades being located between an adjacent pair of said plurality of blind holes and extending longitudinally therebetween;

a plurality of LED dies respective disposed within said plurality of blind holes and affixed therein to be at a depth beneath said upper surface of said guide rod, each said LED die having a pair of conductor wires extending therefrom and connected to a pair of said conductor blades disposed on opposing longitudinal sides of said blind hole, whereby each said blind hole concentrates light from a corresponding one of said LED dies disposed therein; and a plurality of high crowned transparent lenses respectively overlaying each of said plurality of blind holes for uniformly distributing said concentrated light emitted therefrom.

* * * * *